UNITED STATES PATENT OFFICE.

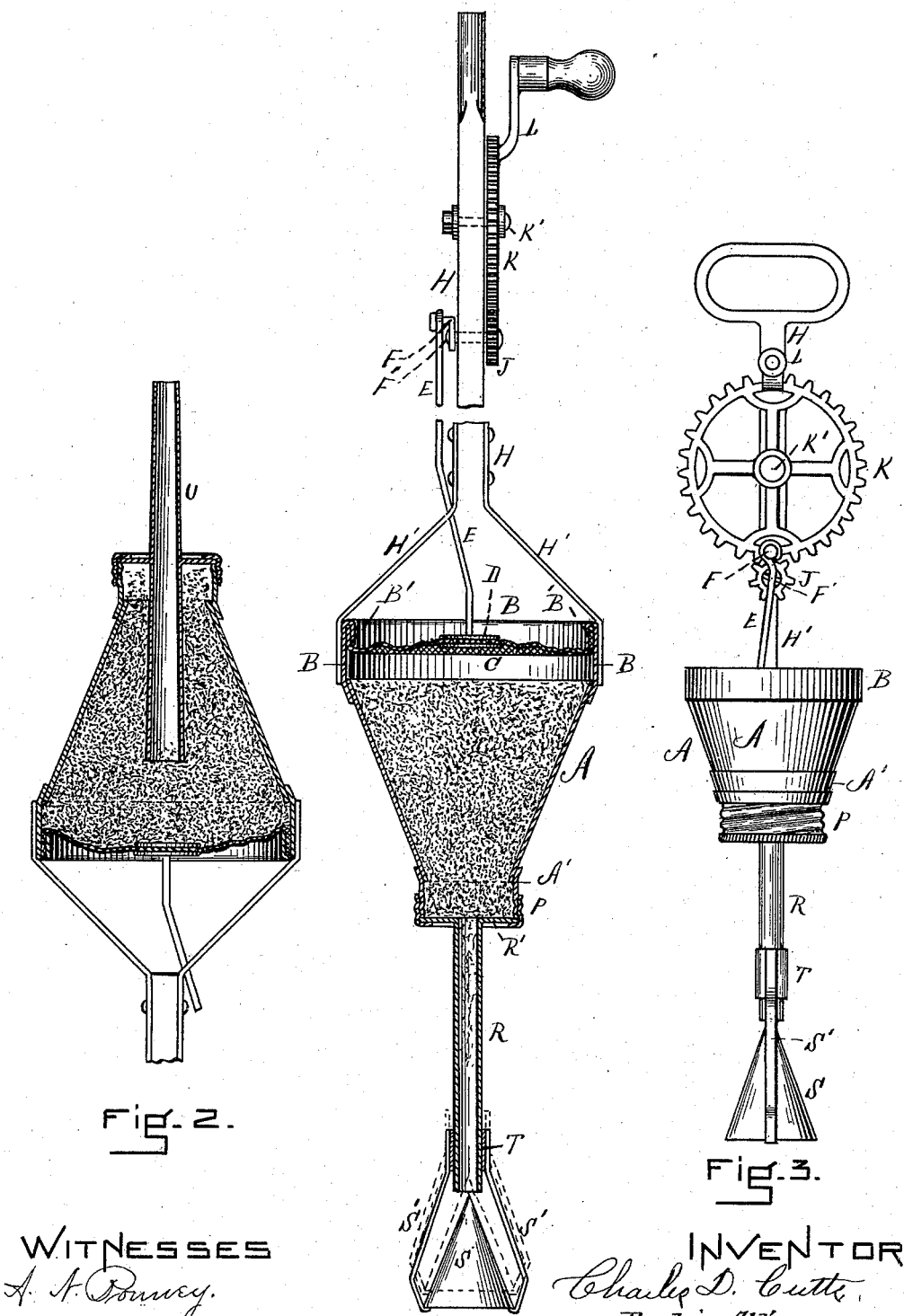

CHARLES D. CUTTS, OF FORT FAIRFIELD, MAINE.

INSECT-POWDER DISTRIBUTER.

SPECIFICATION forming part of Letters Patent No. 567,640, dated September 15, 1896.

Application filed January 28, 1896. Serial No. 577,143. (No model.)

*To all whom it may concern:*

Be it known that I, CHARLES D. CUTTS, a citizen of the United States, residing at Fort Fairfield, in the county of Aroostook and State of Maine, have invented new and useful Improvements in Insect-Powder Distributers, of which the following is a specification.

This is an apparatus for the application of insect-powder, such as paris-green, hellebore, &c., to potato-bugs, canker-worms, curculio, and the like, whether such pests are located near the ground, as in the case of potato-bugs, or higher up, as in the case of curculio on apple-trees; and the nature of the invention consists in the novel construction and arrangement of parts fully described below, and illustrated in the accompanying drawings, in which—

Figure 1 is a central vertical section of my improved apparatus arranged for spraying the powder, a portion of the supporting-pole being represented as broken out. Fig. 2 is a similar section showing the device arranged without the spreader and intended to send the powder for a considerable distance, as into the branches of a tree, for example. Fig. 3 is an elevation of the device constructed on a somewhat smaller scale and provided with a handle.

Similar letters of reference indicate corresponding parts.

A represents a tunnel-shaped vessel whose upper end is provided with the annular vertical flange B. The upper edge of this flange is folded inwardly at B', and between the fold thus produced and the flange there is secured the edge of a circular flexible diaphragm C. This diaphragm is made slack enough to allow of its being worked up and down by a disk or head D, secured centrally thereto and connected by a rod E with a crank F, which extends from a shaft F', sustained in the pole H, which may be made of any desired length, and which is connected with the receptacle A by means of the arms or bars H'. Fast on the outer end of the shaft F' is a pinion J, which is engaged by the gear-wheel K on the pin K', supported by the pole H. This gear-wheel is provided with a handle L.

Rigidly secured to the lower end of the vessel A, containing the powder, is an externally-screw-threaded extension A', upon which is the screw-cap P, and held between said cap P and the lower end of said extension is a centrally-perforated disk or plate R', from which extends downward a pipe or tube R. Upon the lower end of this pipe R there is secured a spreader, which consists of a cone S with its apex held in a position directly under the center of the tube R and close to the end of said tube by means of the supporting-arms S', which extend from the tube or sleeve T down to the base of the cone S, as shown.

In practical operation the device is grasped by means of the pole H and the cone S pointed in the direction of the locality to be sprayed. By operating the handle L the gear-wheel K is rotated, and by means of the pinion J, crank F, and connecting-rod E the diaphragm C is rapidly vibrated or worked down and up, with the effect of driving the insect-powder through the tube R, at the lower end of which it is deflected or sprayed by the conical spreader S, so that quite a considerable area is covered, and a tree may be thoroughly sprayed in a very short time. Spreaders S, of greater or less diameter, may be used, as desired, different gages of spreaders being substituted for each other by removing the tube R and the disk R' and inserting another set with a spreader of a different size. The flow of powder may be varied by moving the spreader up and down on the tube R.

In case it is desired to throw the powder to a considerable distance, such as to the higher branches of a tree, the disk R', carrying the tube R and spreader S, is removed by unscrewing the cap P, and a similar disk is inserted, into which is fixed a plain tube or nozzle U, Fig. 2, the rest of the device being as usual. For very near work the smaller sprayer (shown in Fig. 3) is desirable.

Having thus fully described my invention, what I claim, and desire to scure by Letters Patent, is—

1. The herein-described improved insect-powder distributer, comprising the conical vessel A containing the powder, the flexible diaphragm C secured to and across the upper portion of said vessel, the pole H supporting the vessel by means of suitable connecting-bars, a gear provided with a suitable handle and sustained by said pole, the reciprocating connecting-rod E whose lower end is secured centrally to the diaphragm and whose upper end is operated by a crank connected with the gear, the lower screw-threaded end or extension A' rigid with the vessel A, the screw-cap P, and the disk or plate R' from which a tube or nozzle extends, said disk or plate being held between said screw-cap and the lower end of the extension, substantially as described.

2. The herein-described improved insect-powder distributer, comprising the conical vessel A containing the powder, the flexible diaphragm C secured to and across the upper portion of said vessel, a handle connected with the vessel, mechanism connected centrally with the diaphragm whereby the latter is vibrated or worked down and up, the screw-threaded portion or extension A' at the lower end of the vessel, the screw-cap P upon said portion, the centrally-perforated disk or plate R' held between the screw-cap and the lower end of said extension, the pipe R extending down from the disk or plate, and the conical spreader S supported by arms connected with said pipe and with its apex centrally under the lower end of the pipe, substantially as set forth.

CHARLES D. CUTTS.

Witnesses:
A. W. THOMPSON,
CHAS. L. RICHARDS.